US009637217B2

(12) United States Patent
Marrinan et al.

(10) Patent No.: US 9,637,217 B2
(45) Date of Patent: May 2, 2017

(54) AIRCRAFT HAVING AN AFT ENGINE

(71) Applicant: General Electric Company, Schenectady, NY (US)

(72) Inventors: Patrick Michael Marrinan, Mason, OH (US); Thomas Lee Becker, Symmes Township, OH (US); Kurt David Murrow, Liberty Township, OH (US); Jixian Yao, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/859,549

(22) Filed: Sep. 21, 2015

(65) Prior Publication Data
US 2017/0081013 A1    Mar. 23, 2017

(51) Int. Cl.
B64D 27/00 (2006.01)
B64C 1/16 (2006.01)
B64D 27/14 (2006.01)
B64D 29/00 (2006.01)

(52) U.S. Cl.
CPC ............ *B64C 1/16* (2013.01); *B64D 27/14* (2013.01); *B64D 29/00* (2013.01); *B64C 2230/00* (2013.01)

(58) Field of Classification Search
CPC .......... B64C 1/16; B64D 27/15; B64D 27/20; B64D 27/26; B64D 29/04; B64D 33/02; B64D 33/04
USPC ........................................................ 244/55
See application file for complete search history.

(56) References Cited

U.S. PATENT DOCUMENTS

| 2,812,912 A | 11/1957 | Stevens et al. |
| 3,194,516 A | 7/1965 | Messerschmitt |
| 3,286,470 A | 11/1966 | Gerlaugh |
| 3,289,975 A * | 12/1966 | Hall ................... B64C 29/0066 244/12.5 |
| 3,312,448 A | 4/1967 | Hull, Jr. et al. |

(Continued)

FOREIGN PATENT DOCUMENTS

| FR | 2993859 A1 | 1/2014 |
| GB | GB 2489311 A | 9/2012 |

(Continued)

OTHER PUBLICATIONS http://aviationweek.com/awin/boeing-researches-alternative-propulsion-and-fuel-options, Aviation Week & Space Technology, Jun. 4, 2012.

(Continued)

*Primary Examiner* — Richard G Davis
(74) *Attorney, Agent, or Firm* — GE Global Patent Operation; William S. Munnerlyn

(57) ABSTRACT

An aircraft is provided including a fuselage and an aft engine. The fuselage defines a top side, a bottom side, and a frustum located proximate an aft end of the aircraft. The frustum defines a top reference line extending along the frustum at a top side of the fuselage, and a bottom reference line extending along the frustum at a bottom side of the fuselage. The top and bottom reference lines meet at a reference point aft of the frustum. The fuselage further defines a recessed portion located aft of the frustum and indented inwardly from the bottom reference line. The aft engine includes a nacelle extending adjacent to the recessed portion of the fuselage such that the aft engine may be included with the aircraft without interfering with, e.g., a takeoff angle of the aircraft.

20 Claims, 6 Drawing Sheets

(56) References Cited

U.S. PATENT DOCUMENTS

| | | | |
|---|---|---|---|
| 3,844,110 A | 10/1974 | Widlansky et al. | |
| 4,089,493 A | 5/1978 | Paulson | |
| 4,371,133 A * | 2/1983 | Edgley | B64C 11/001 244/13 |
| 4,605,185 A | 8/1986 | Reyes | |
| 4,722,357 A | 2/1988 | Wynosky | |
| 4,913,380 A | 4/1990 | Verdaman et al. | |
| 5,721,402 A | 2/1998 | Parente | |
| 5,927,644 A | 7/1999 | Ellis et al. | |
| 6,089,505 A | 7/2000 | Gruensfelder et al. | |
| 6,976,655 B2 | 12/2005 | Thompson | |
| 7,387,189 B2 | 6/2008 | James et al. | |
| 7,493,754 B2 | 2/2009 | Moniz et al. | |
| 7,665,689 B2 | 2/2010 | McComb | |
| 7,806,363 B2 | 10/2010 | Udall et al. | |
| 7,819,358 B2 | 10/2010 | Belleville | |
| 7,905,449 B2 | 3/2011 | Cazals et al. | |
| 7,976,273 B2 | 7/2011 | Suciu et al. | |
| 8,033,094 B2 | 10/2011 | Suciu et al. | |
| 8,099,944 B2 | 1/2012 | Foster et al. | |
| 8,109,073 B2 | 2/2012 | Foster et al. | |
| 8,162,254 B2 | 4/2012 | Roche | |
| 8,181,900 B2 | 5/2012 | Chene et al. | |
| 8,220,739 B2 | 7/2012 | Cazals | |
| 8,226,040 B2 | 7/2012 | Neto | |
| 8,291,716 B2 | 10/2012 | Foster et al. | |
| 8,317,126 B2 | 11/2012 | Harris et al. | |
| 8,469,306 B2 | 6/2013 | Kuhn, Jr. | |
| 8,544,793 B1 | 10/2013 | Shammoh | |
| 8,549,833 B2 | 10/2013 | Hyde et al. | |
| 8,596,036 B2 | 12/2013 | Hyde et al. | |
| 8,640,439 B2 | 2/2014 | Hoffjann et al. | |
| 8,672,263 B2 | 3/2014 | Stolte | |
| 8,684,304 B2 | 4/2014 | Burns et al. | |
| 8,857,191 B2 | 10/2014 | Hyde et al. | |
| 8,890,343 B2 | 11/2014 | Bulin et al. | |
| 8,939,399 B2 | 1/2015 | Kouros et al. | |
| 8,998,580 B2 | 4/2015 | Quiroz-Hernandez | |
| 9,038,398 B2 | 5/2015 | Suciu et al. | |
| 2008/0023590 A1 | 1/2008 | Merrill et al. | |
| 2010/0038473 A1 | 2/2010 | Schneider et al. | |
| 2010/0294882 A1 | 11/2010 | Gantie et al. | |
| 2011/0215204 A1 | 9/2011 | Evulet | |
| 2012/0076635 A1 | 3/2012 | Atassi | |
| 2012/0119020 A1 | 5/2012 | Burns et al. | |
| 2012/0153076 A1 | 6/2012 | Burns et al. | |
| 2012/0209456 A1 | 8/2012 | Harmon et al. | |
| 2013/0032215 A1 | 2/2013 | Streifinger | |
| 2013/0036730 A1 | 2/2013 | Bruno et al. | |
| 2013/0052005 A1 | 2/2013 | Cloft | |
| 2013/0099065 A1 | 4/2013 | Stuhlberger | |
| 2013/0139515 A1 | 6/2013 | Schlak | |
| 2013/0184958 A1 | 7/2013 | Dyrla et al. | |
| 2013/0227950 A1 | 9/2013 | Anderson et al. | |
| 2013/0251525 A1 | 9/2013 | Saiz | |
| 2013/0284279 A1 | 10/2013 | Richards | |
| 2014/0010652 A1 | 1/2014 | Suntharalingam et al. | |
| 2014/0060995 A1 | 3/2014 | Anderson et al. | |
| 2014/0151495 A1 | 6/2014 | Kuhn, Jr. | |
| 2014/0212279 A1 | 7/2014 | Boudebiza et al. | |
| 2014/0250861 A1 | 9/2014 | Eames | |
| 2014/0283519 A1 | 9/2014 | Mariotto et al. | |
| 2014/0290208 A1 | 10/2014 | Rechain et al. | |
| 2014/0339371 A1 | 11/2014 | Yates et al. | |
| 2014/0345281 A1 | 11/2014 | Galbraith | |
| 2014/0346283 A1 | 11/2014 | Salyer | |
| 2014/0367510 A1 | 12/2014 | Viala et al. | |
| 2014/0367525 A1 | 12/2014 | Salyer | |
| 2014/0369810 A1 | 12/2014 | Binks et al. | |
| 2015/0013306 A1 | 1/2015 | Shelley | |
| 2015/0028594 A1 | 1/2015 | Mariotto | |
| 2015/0285144 A1 | 10/2015 | Todorovic et al. | |
| 2015/0291285 A1 * | 10/2015 | Gallet | F01D 13/02 415/60 |
| 2016/0214727 A1 | 7/2016 | Hamel et al. | |
| 2016/0332741 A1 | 11/2016 | Moxon | |

FOREIGN PATENT DOCUMENTS

| | | |
|---|---|---|
| WO | WO 2010/020199 A1 | 5/2010 |
| WO | WO 2014/072615 A1 | 5/2014 |

OTHER PUBLICATIONS

Bradley et al., "Subsonic Ultra Green Aircraft Research, Phase II: N+4 Advanced Concept Development," NASA/CR-2012-217556, May 2012.

US Non-Final Office action issued in connection with Related U.S. Appl. No. 14/859,556 on Feb. 39, 2017.

US Non-Final Office action issued in connection with Related U.S. Appl. No. 14/859,566 on Feb. 1, 2017.

* cited by examiner

AIRCRAFT HAVING AN AFT ENGINE

FIELD OF THE INVENTION

The present subject matter relates generally to an aircraft having an aft engine, or more particularly to a fuselage of an aircraft designed to accommodate an aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines also affects the net propulsive thrust of the aircraft. A total amount of drag on the aircraft, including skin friction, form, and induced drag, is generally proportional to a difference between a freestream velocity of air approaching the aircraft and an average velocity of a wake downstream from the aircraft that is produced due to the drag on the aircraft.

Systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines upstream from a fan section of the turbofan jet engines. Although this configuration can reduce drag by reenergizing the boundary layer airflow downstream from the aircraft, the relatively slow moving flow of air from the boundary layer entering the turbofan jet engine generally has a nonuniform or distorted velocity profile. As a result, such turbofan jet engines can experience an efficiency loss minimizing or negating any benefits of reduced drag on the aircraft.

A dedicated boundary layer ingestion propulsor may be added to the aircraft. However, if such boundary layer ingestion propulsor is positioned to ingest boundary layer ingestion air at an aft end of the aircraft, such boundary layer ingestion propulsor may interfere with a takeoff angle of the aircraft. Accordingly, an aircraft capable of energizing slow-moving air forming a boundary layer across the fuselage of the aircraft would be useful. Specifically, an aircraft capable of energizing slow-moving air forming a boundary layer across the fuselage of the aircraft without interfering with a takeoff angle of the aircraft would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aircraft is provided. The aircraft extends between a forward end and an aft end and includes a fuselage defining a top side and a bottom side. The fuselage additionally defines a frustum located proximate the aft end of the aircraft. The frustum defines a top reference line extending along the frustum at the top side of the fuselage and a bottom reference line extending along the frustum at the bottom side of the fuselage. The top and bottom reference lines meet at a reference point located aft of the frustum. The fuselage further defines a recessed portion located aft of the frustum and indented inwardly from the bottom reference line. The aircraft also includes an aft engine including a nacelle extending adjacent to the recessed portion of the fuselage.

In another exemplary embodiment of the present disclosure, an aircraft is provided. The aircraft defines a longitudinal centerline and includes a pair of wings, each wing defining a top side and a bottom side and having landing gear extending from a bottom side thereof. The aircraft also includes a fuselage defining a top side and a bottom side, the bottom side of the fuselage and the landing gear together defining a maximum takeoff angle with the longitudinal centerline. The fuselage further defines a recessed portion at the bottom side of the fuselage located aft of the pair of wings and defining an angle with the longitudinal centerline greater than the maximum takeoff angle. The aircraft additionally includes an aft engine located aft of the pair of wings and including a nacelle extending adjacent to the recessed portion of the fuselage These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
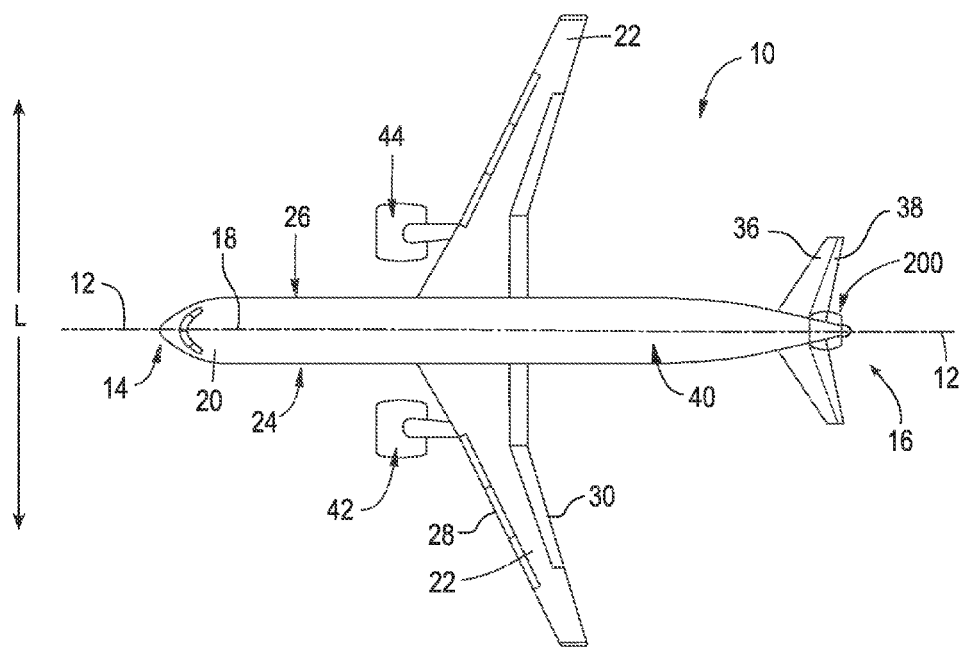
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
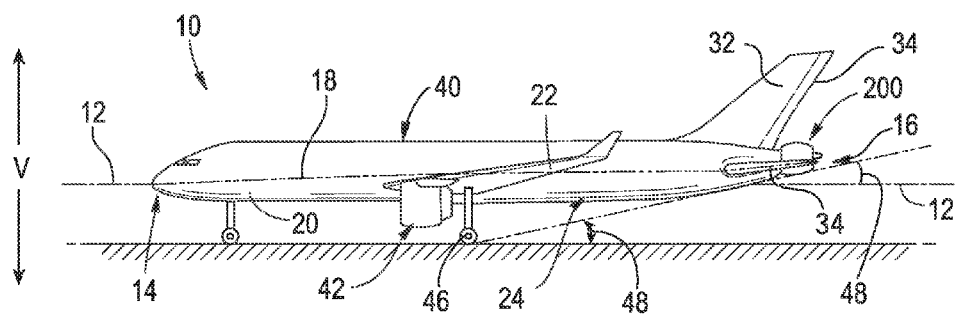
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side 24 view of the aircraft 10 as illustrated in FIG. 1. As shown in FIGS. 1 and 2 collectively, the aircraft 10 defines a longitudinal centerline 12 that extends therethrough, a vertical direction V, a lateral direction L, a forward end 14, and an aft end 16. Moreover, the aircraft 10 defines a mean line 18 extending between the forward end 14 and aft end 16 of the aircraft 10. As used herein, the "mean line" refers to a midpoint line extending along a length of the aircraft 10, not taking into account the appendages of the aircraft 10 (such as the wings 22 and stabilizers discussed below).

Moreover, the aircraft 10 includes a fuselage 20, extending longitudinally from the forward end 14 of the aircraft 10 towards the aft end 16 of the aircraft 10, and a pair of wings 22. The first of such wings 22 extends laterally outwardly with respect to the longitudinal centerline 12 from the port side 24 of the fuselage 20 and the second of such wings 22 extends laterally outwardly with respect to the longitudinal centerline 12 from a starboard side 26 of the fuselage 20. Each of the wings 22 for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

The exemplary aircraft 10 of FIGS. 1 and 2 also includes a propulsion system. The exemplary propulsion system includes a plurality of aircraft engines, at least one of which mounted to each of the pair of wings 22. Specifically, the plurality of aircraft engines includes a first aircraft engine 42 mounted to a first wing of the pair of wings 22 and a second aircraft engine 44 mounted to a second wing of the pair of wings 22. In at least certain exemplary embodiments, the aircraft engines 42, 44 may be configured as turbofan jet engines suspended beneath the wings 22 in an under-wing configuration. For example, in at least certain exemplary embodiments, the first and/or second aircraft engines 42, 44 may be configured in substantially the same manner as the exemplary turbofan jet engine 100 described below with reference to FIG. 3. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Additionally, the propulsion system includes an aft engine 200 mounted to the fuselage 20 of the aircraft 10 proximate the aft end 16 of the aircraft 10, or more particularly at a location aft of the wings 22 and aircraft engines 42, 44. The exemplary aft engine 200 is mounted to the fuselage 20 of the aircraft 10 such that the mean line 18 extends therethrough. The aft engine 200 will be discussed in greater detail below with reference to FIGS. 4 through 7.

Referring specifically to FIG. 2, the aircraft 10 additionally includes landing gear, such as wheels 46, extending from a bottom side of the fuselage 20 and from a bottom side of the wings 22. The fuselage 20 is designed to allow the aircraft 10 to takeoff and/or land at a takeoff angle 48 with the ground without the aft end 16 scraping the ground. As will be discussed below, the exemplary fuselage 20 and aft engine 200 described herein are designed to allow the aircraft 10 to maintain a desired takeoff angle 48, despite the addition of the aft engine 200 proximate the aft end 16 of the aircraft 10. Notably, for the embodiment depicted, the longitudinal centerline 12 of the aircraft 10 is parallel to the ground when the aircraft 10 is on the ground. Accordingly, the maximum takeoff angle 48, as shown, may alternatively be defined with the longitudinal centerline 12 of the aircraft 10 (shown as angle 48' in FIG. 2).

Figure 3:
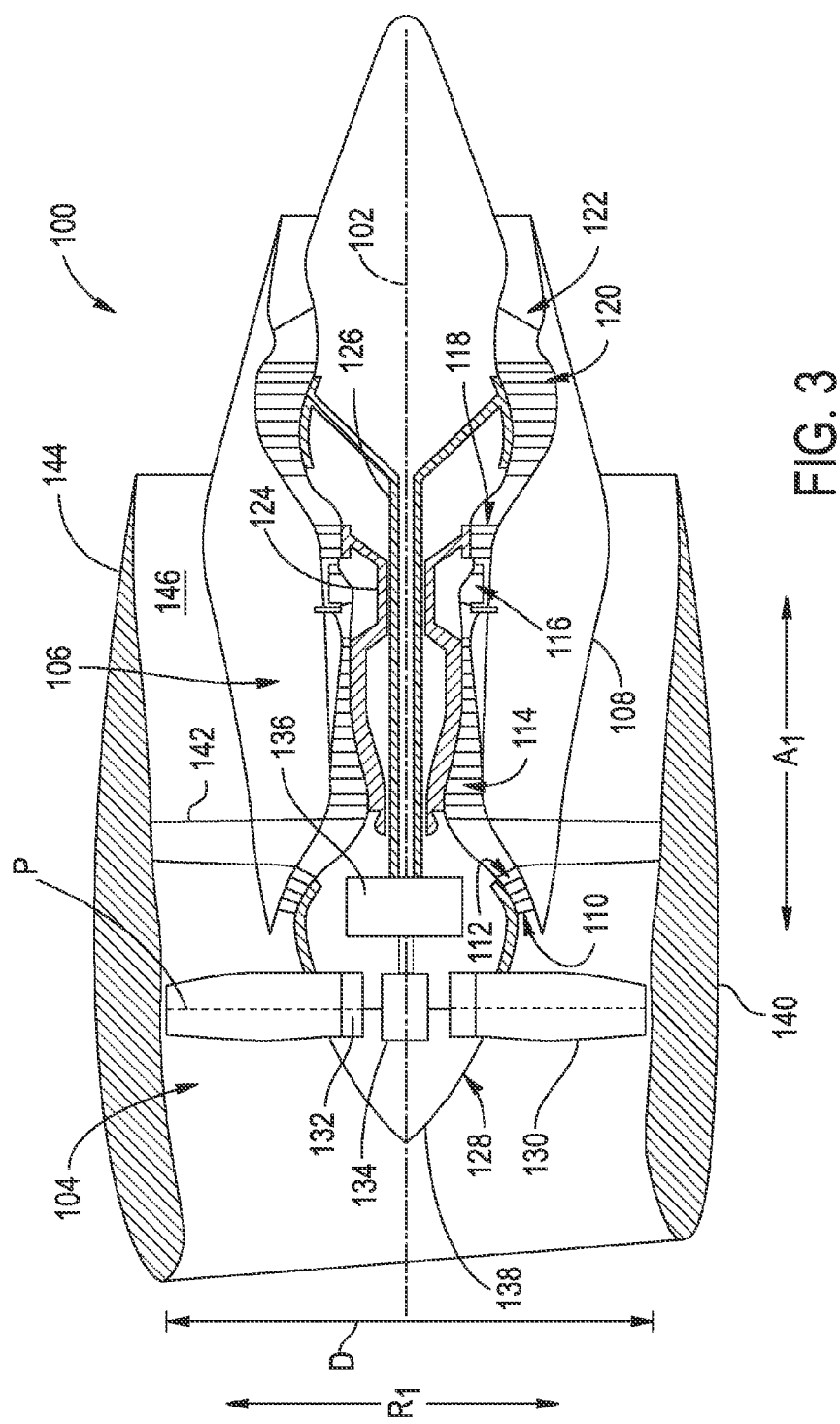
FIG. 3 is a schematic, cross-sectional view of a gas turbine engine in accordance with an exemplary embodiment of the present disclosure.

Referring now to FIG. 3, a schematic, cross-sectional view of an exemplary aircraft engine is provided. Specifically, for the embodiment depicted, the aircraft engine is configured as a high bypass turbofan jet engine, referred to herein as "turbofan engine 100." As discussed above, one or both of the first and/or second aircraft engines 42, 44 of the exemplary aircraft 10 described in FIGS. 1 and 2 may be configured in substantially the same manner as the exemplary turbofan engine 100 of FIG. 3.

As shown in FIG. 3, the turbofan engine 100 defines an axial direction $A_1$ (extending parallel to a longitudinal centerline 102 provided for reference) and a radial direction $R_1$. In general, the turbofan 10 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. A high pressure (HP) shaft or spool 124 drivingly connects the HP turbine 118 to the HP compressor 114. A low pressure (LP) shaft or spool 126 drivingly connects the LP turbine 120 to the LP compressor 112. The compressor section, combustion section 116, turbine section, and nozzle section 122 together define a core air flowpath 37.

For the embodiment depicted, the fan section 104 includes a variable pitch fan 128 having a plurality of fan blades 130 coupled to a disk 132 in a spaced apart manner. As depicted, the fan blades 130 extend outwardly from disk 132 generally along the radial direction R and define a fan diameter D. Each fan blade 130 is rotatable relative to the disk 132 about a pitch axis P by virtue of the fan blades 130 being operatively coupled to a suitable actuation member 134 configured to collectively vary the pitch of the fan blades 130 in unison. The fan blades 130, disk 132, and actuation member 134 are together rotatable about the longitudinal axis 12 by LP shaft 126 across a power gear box 136. The power gear box 136 includes a plurality of gears for adjusting the rotational speed of the fan 128 relative to the LP shaft 126 to a more efficient rotational fan speed.

Referring still to the exemplary embodiment of FIG. 3, the disk 132 is covered by rotatable front hub 138 aerodynamically contoured to promote an airflow through the plurality of fan blades 130. Additionally, the exemplary fan section 104 includes an annular fan casing or outer nacelle 140 that circumferentially surrounds the fan 128 and/or at least a portion of the core turbine engine 106. It should be appreciated that the nacelle 140 may be configured to be supported relative to the core turbine engine 106 by a plurality of circumferentially-spaced outlet guide vanes 142. Moreover, a downstream section 144 of the nacelle 140 may extend over an outer portion of the core turbine engine 106 so as to define a bypass airflow passage 146 therebetween.

It should be appreciated, however, that the exemplary turbofan engine 100 depicted in FIG. 3 is by way of example only, and that in other exemplary embodiments, the turbofan engine 100 may have any other suitable configuration, including, e.g., any suitable number of shafts or spools, compressors, and/or turbines.

Figure 4:
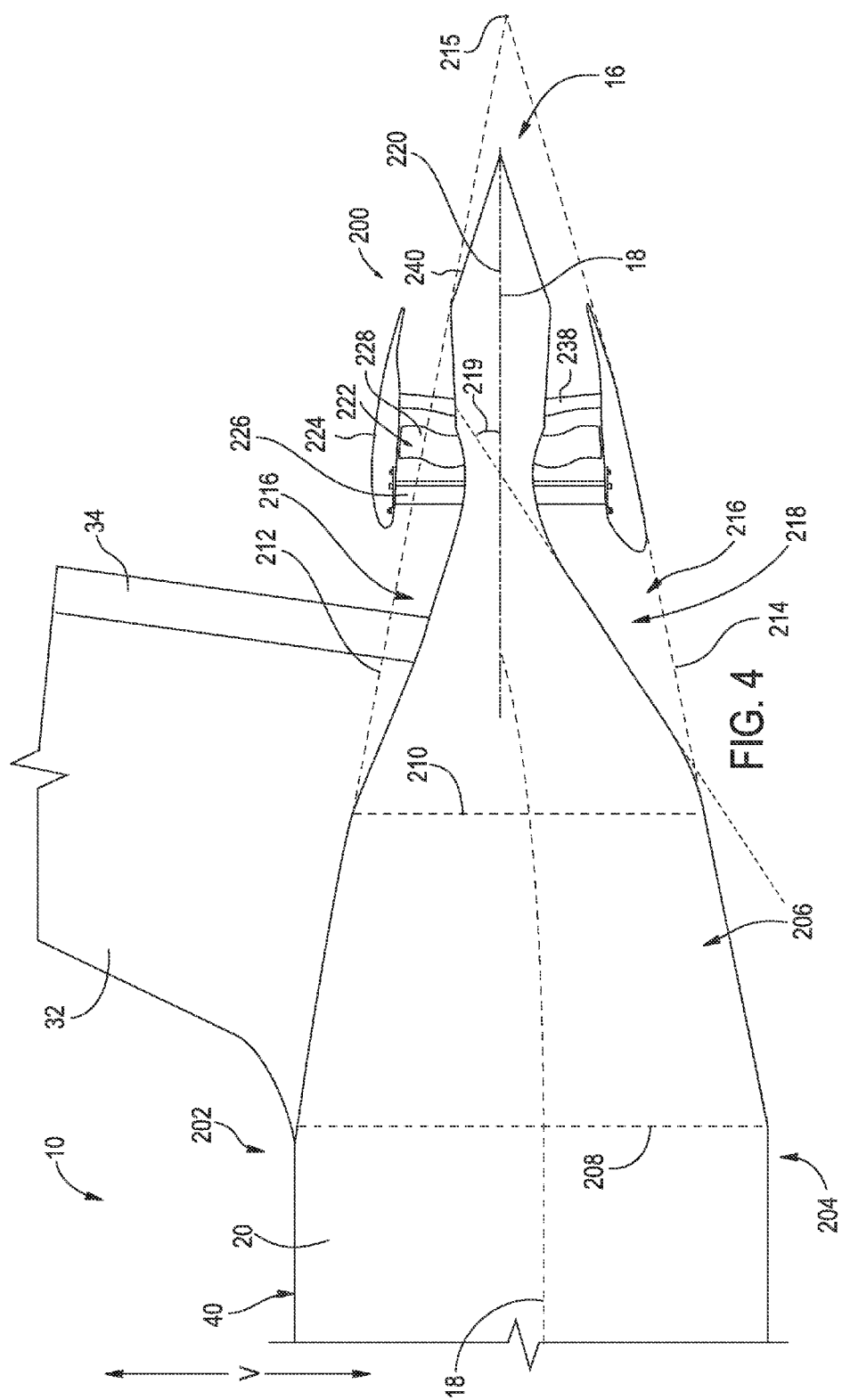
FIG. 4 is a close-up, schematic, cross-sectional view of an aft end of the exemplary aircraft of FIG. 1.

Referring now to FIG. 4, a close-up view is provided of the aft end 16 of the exemplary aircraft 10 described above with reference to FIGS. 1 and 2. As discussed above, the fuselage 20 of the aircraft 10 extends generally from the forward end 14 of the aircraft 10 towards the aft end 16 of the aircraft 10, with the aft engine 200 mounted to the fuselage 20 proximate the aft end 16 of the aircraft 10. The fuselage 20 defines a top side 202 and a bottom side 204 along the vertical direction V.

Moreover, the exemplary fuselage 20 depicted defines a frustum 206 located proximate the aft end 16 of the aircraft 10. Specifically, for the embodiment depicted, the frustum 206 is positioned aft of the pair of wings 22 of the aircraft 10. As used herein, the term "frustum" refers generally to a portion of a shape lying between two parallel planes. Accordingly, for the embodiment depicted, the frustum 206 is defined between a first, or forward plane 208 and a second, or aft plane 210, the forward and aft planes 208, 210 being parallel to one another and perpendicular to the longitudinal centerline 12 of the aircraft 10 (see FIGS. 1 and 2). As depicted in phantom, the frustum 206 defines a top reference line 212 extending along the frustum 206 at the top side 202 of the fuselage 20, and a bottom reference line 214 extending along the frustum 206 at the bottom side 204 of the fuselage 20. Notably, the frustum 206 depicted has a generally tapered shape as it approaches the aft end 16 of the aircraft 10, such that the top and bottom reference lines 212, 214 meet at a reference point 215 aft of the frustum 206. Specifically, the exemplary frustum 206 defines a height along the vertical direction V at the forward plane 208 that is greater than a height along the vertical direction V at the aft plane 210.

The exemplary frustum 206 depicted defines a generally frustoconical shape having a straight top side and a straight bottom side between the forward and aft planes 208, 210. Accordingly, the top reference line 212 of the frustum 206 extends along a surface of the frustum 206 the top side 202 of the fuselage 20 (i.e., along the surface 40 of the fuselage 20) and the bottom reference line 214 extends along the surface of the frustum 206 (i.e., also along the surface 40 of the fuselage 20) at the bottom side 204 of the fuselage 20. However, in other embodiments, the frustum 206 may instead define a surface having curved lines between the forward plane 208 and the aft plane 210 at the top side 202 of the fuselage 20 and/or at the bottom side 204 of the fuselage 20. In such an embodiment, the top and bottom reference lines 212, 214 may instead extend along a mean line of the surface of the frustum 206 between the forward and aft planes 208, 210 at the top and bottom sides 202, 204 of the fuselage 20.

Referring still to FIG. 4, the fuselage 20 further defines a recessed portion 216 located aft of the frustum 206. The recessed portion 216 is indented at the bottom side 204 of the fuselage 20 inwardly (i.e., towards the mean line 18 of the aircraft 10) from the bottom reference line 214. Similarly for the embodiment depicted, the recessed portion 216 is also indented at the top side 202 of the fuselage 20 inwardly from the top reference line 212. Moreover, as is depicted the recessed portion 216 includes a bottom concave portion 218 as viewed from the bottom reference line 214. Further, it will be appreciated that the recessed portion 216 at the bottom side 204 of the fuselage 20 defines an angle 219 with the longitudinal centerline 12. The angle 219 defined by the recessed portion 216 at the bottom side 204 of the fuselage 20 with the longitudinal centerline 12 is greater than the maximum takeoff angle 48 defined with the longitudinal centerline 12 (see FIG. 2). For example, the angle 219 may be at least about ten percent greater than the maximum takeoff angle 48.

In at least certain exemplary embodiments, the angle 219 defined by the recessed portion 216 at the bottom side 204 of the fuselage 20 with the longitudinal centerline 12 may also be greater than a threshold angle for creating separated flow during normal flight, if not for operation of the aft engine 200. Specifically, the angle 219 may be such that if the aft engine 200 were not present and operating during normal flight (i.e., during a normal cruise speed and altitude of the aircraft 10), the air would separate from the recessed portion 216 at the bottom side 204 of the fuselage 20. For example, in certain exemplary embodiments, the angle 219 may be at least about thirteen degrees. However, in other exemplary embodiments, the angle 219 may instead be at least about fourteen degrees, at least about fifteen degrees, or at least about sixteen degrees. As will be appreciated, as used herein, the term "separation" or "separate," when used to describe fluid flow, refers to a condition wherein a fluid flow around an object becomes detached from a surface of the object, and instead takes the forms of eddies and/or vortices, which can result in an increased drag on such object.

Notably, referring still to FIG. 4, for the embodiment depicted, the frustum 206 is formed of a portion of the fuselage 20 between where the fuselage 20 begins to taper from a cylindrical body portion to the recessed portion 216. Accordingly, the frustum 206 may define a ratio of length (along the longitudinal centerline 12) to average height (i.e., the average height at the forward plane 208 and at the aft plane 210) greater than or equal to about 0.2, such as greater than or equal to about 0.25, 0.4, or 0.5. Further, as may be seen in, e.g., FIG. 2, the bottom reference line 214 may define an angle with the longitudinal centerline 12 substantially the same as the takeoff angle 48 of the aircraft 10. It should be appreciated, that as used herein, terms of approximation, such as "approximately," "substantially," or "about," refer to being within a ten percent margin of error.

Figure 5:
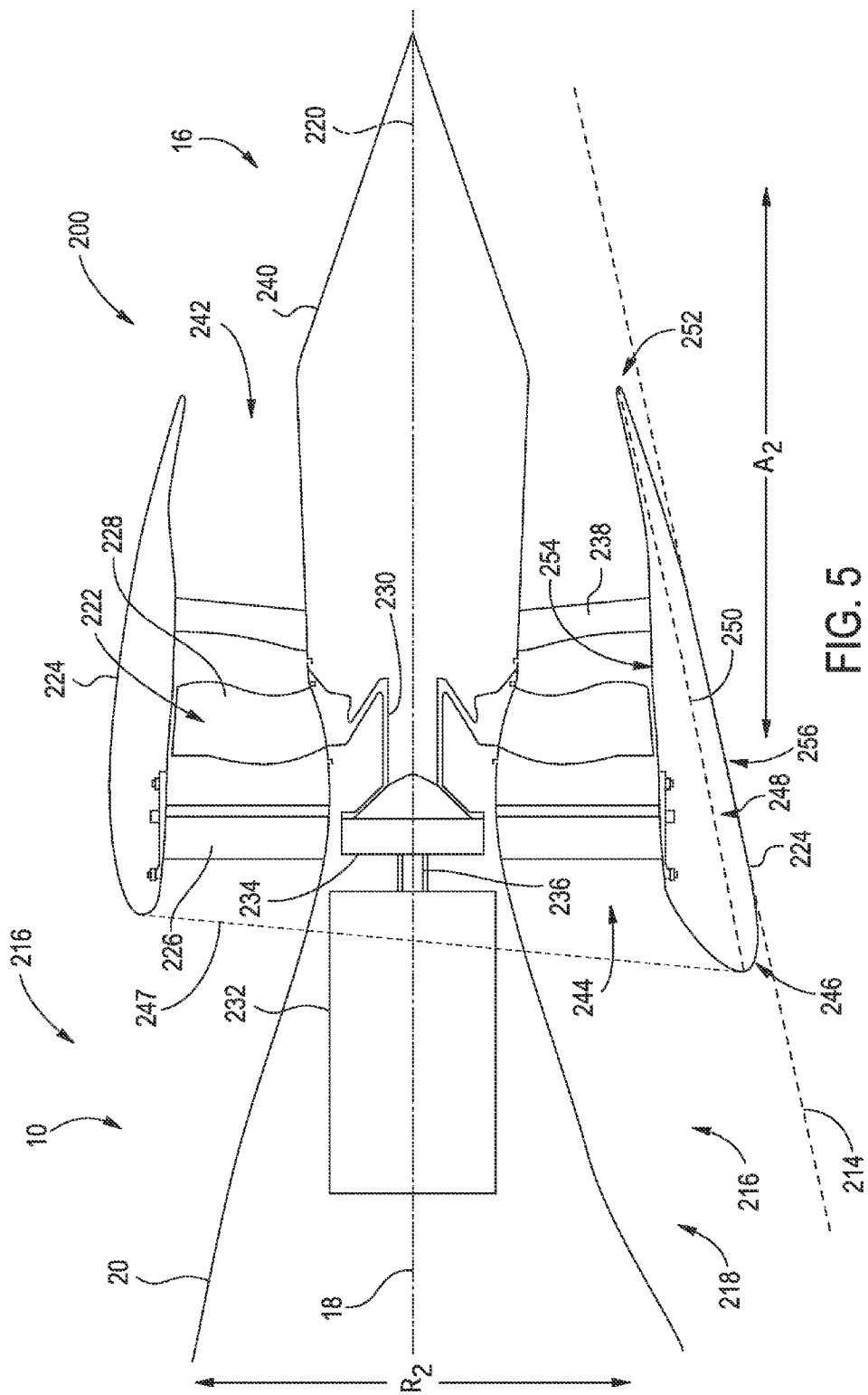
FIG. 5 is a schematic, cross-sectional view of an aft engine in accordance with an exemplary embodiment of the present disclosure.

Referring now also to FIG. 5, a close-up, schematic, cross-sectional view of the exemplary aft engine 200 of FIGS. 1 and 2 is provided. As discussed, the exemplary aft engine 200 is mounted to the fuselage 20 proximate the aft end 16 of the aircraft 10. The aft engine 200 depicted defines an axial direction $A_2$ extending along a longitudinal centerline axis 220 that extends therethrough for reference, a radial direction $R_2$, and a circumferential direction $C_2$ (see FIG. 6).

Additionally, for the embodiment depicted, the aft engine 200 is configured as a boundary layer ingestion engine configured to ingest and consume air forming a boundary layer over the fuselage 20 of the aircraft 10. Specifically for the embodiment depicted, the aft engine 200 is configured as a boundary layer ingestion fan mounted to the fuselage 20 of the aircraft 10.

The aft engine 200 includes a fan 222 rotatable about the centerline axis 220, a nacelle 224 extending around a portion of the fan 222, and one or more structural members 226 extending between the nacelle 224 and the fuselage 20 of the aircraft 10. The fan 222 includes a plurality of fan blades 228 spaced generally along circumferential direction $C_2$. Additionally, the nacelle 224 extends around and encircles the plurality of fan blades 228 and extends adjacent to the recessed portion 216 of the fuselage 20. Specifically, the nacelle 224 extends around at least a portion of the fuselage 20 of the aircraft 10 when, as in FIG. 5, the aft engine 200 is mounted to the aircraft 10.

As is also depicted in FIG. 5, the fan 222 further includes a fan shaft 230 with the plurality of fan blades 228 attached thereto. Although not depicted, the fan shaft 230 may be rotatably supported by one or more bearings located forward of the plurality of fan blades 228 and, optionally, one or more bearings located aft of the plurality of fan blades 228. Such bearings may be any suitable combination of roller bearings, ball bearings, thrust bearings, etc.

In certain exemplary embodiments, the plurality of fan blades 228 may be attached in a fixed manner to the fan shaft 230, or alternatively, the plurality of fan blades 228 may be rotatably attached to the fan shaft 230. For example, the plurality of fan blades 228 may be attached to the fan shaft 230 such that a pitch of each of the plurality of fan blades 228 may be changed, e.g., in unison, by a pitch change mechanism (not shown).

The fan shaft 230 is mechanically coupled to a power source 232 located at least partially within the fuselage 20 of the aircraft 10. For the embodiment depicted, the fan shaft 230 is mechanically coupled to the power source 232 through a gearbox 234. The gearbox 234 may be configured to modify a rotational speed of the power source 232, or rather of a shaft 236 of the power source 232, such that the fan 222 of the aft engine 200 rotates at a desired rotational speed. The gearbox 234 may be a fixed ratio gearbox, or alternatively, the gearbox 234 may define a variable gear ratio.

The power source 232 may be any suitable power source. For example, in certain exemplary embodiments the power source 232 may be an electric power source (e.g., the aft engine 200 may be configured as part of a gas-electric propulsion system with the first and/or second aircraft engines 42, 44). However, in other exemplary embodiments, the power source 232 may alternatively be configured as a dedicated gas engine, such as a gas turbine engine. Moreover, in certain exemplary embodiments, the power source 232 may be positioned at any other suitable location within, e.g., the fuselage 20 of the aircraft 10 or the aft engine 200. For example, in certain exemplary embodiments, the power source 232 may be configured as a gas turbine engine positioned at least partially within the aft engine 200.

Referring still to FIGS. 4 and 5, the one or more structural members 226 extend between the nacelle 224 and the fuselage 20 of the aircraft 10 at a location forward of the plurality of fan blades 228. The one or more structural members 226 for the embodiment depicted extend substantially along the radial direction $R_2$ between the nacelle 224 and the fuselage 20 of the aircraft 10 for mounting the aft engine 200 to the fuselage 20 of the aircraft 10. It should also be appreciated, however, that in other exemplary embodiments the one or more structural members 226 may instead extend substantially along the axial direction $A_2$, or in any other suitable direction between the axial and radial directions $A_2$, $R_2$.

The one or more structural members 226 depicted are configured as inlet guide vanes for the fan 222, such that the one or more structural members 226 are shaped and oriented to direct and condition a flow of air into the aft engine 200 to increase an efficiency of the aft engine 200. In certain exemplary embodiments, the one or more structural members 226 may be configured as fixed inlet guide vanes extending between the nacelle 224 and the fuselage 20 of the aircraft 10, or alternatively the one or more structural members 226 may be configured as variable inlet guide vanes.

Moreover, the aft engine 200 includes one or more outlet guide vanes 238 and a tail cone 240. The one or more outlet guide vanes 238 for the embodiment depicted extend between the nacelle 224 and the tail cone 240 for, e.g., adding strength and rigidity to the aft engine 200, as well as for directing a flow of air through the aft engine 200. The outlet guide vanes 238 may be evenly spaced along the circumferential direction $C_2$ (see FIG. 6), or may have any other suitable spacing. Additionally, the outlet guide vanes 238 may be fixed outlet guide vanes, or alternatively may be variable outlet guide vanes.

Aft of the plurality of fan blades 228, and for the embodiment depicted, aft of the one or more outlet guide vanes 238, the aft engine 200 additionally defines a nozzle 242 between the nacelle 224 and the tail cone 240. The nozzle 242 may be configured to generate an amount of trust from the air flowing therethrough, and the tail cone 240 may be shaped to minimize an amount of drag on the aft engine 200. However, in other embodiments, the tail cone 240 may have any other shape and may, e.g., end forward of an aft end of the nacelle 224 such that the tail cone 240 is enclosed by the nacelle 224 at an aft end. Additionally, in other embodiments, the aft engine 200 may not be configured to generate any measureable amount of thrust, and instead may be configured to ingest air from a boundary layer of air of the fuselage 20 of the aircraft 10 and add energy/speed up such air to reduce an overall drag on the aircraft 10 (and thus increase a net thrust of the aircraft 10).

Figure 6:
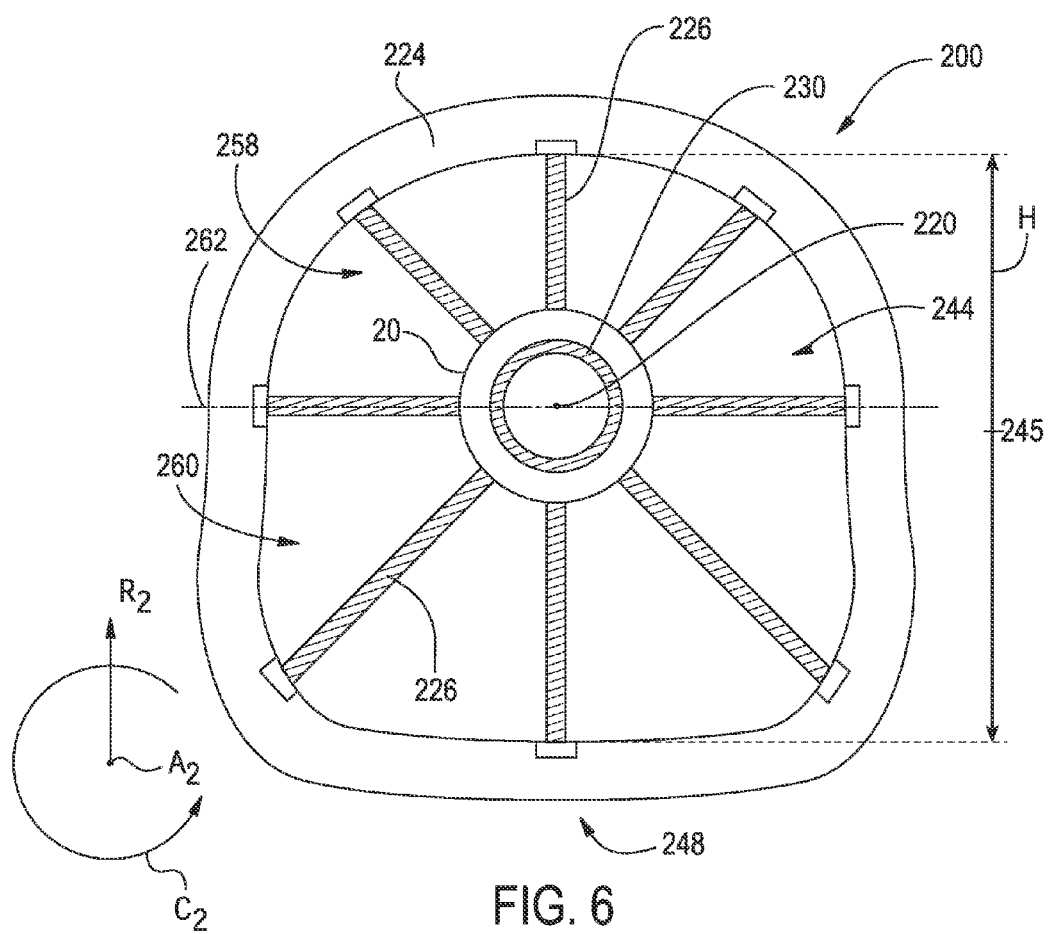
FIG. 6 is a cross-sectional view of an inlet of the exemplary aft engine of FIG. 5 taken along a centerline axis of the exemplary aft engine of FIG. 5.

Referring still to FIGS. 4 and 5, and now also to FIG. 6, the aft engine 200, or rather the nacelle 224, defines an inlet 244 at a forward end 246 of the nacelle 224. The inlet 244 is defined by the nacelle 224 with the fuselage 20, i.e., between the nacelle 224 and the fuselage 20. As mentioned above, the nacelle 224 of the aft engine 200 extends around and surrounds the plurality of fan blades 228 of the fan 222 of the aft engine 200. For the embodiment depicted, nacelle 224 also extends at least partially around the central axis 220 of the aft engine 200, at least partially around the mean line 18 of the aircraft 10, and at least partially around the recessed portion 216 of the fuselage 20 of the aircraft 10. Specifically, for the embodiment depicted, the nacelle 224 extends substantially three hundred and sixty degrees (360°) around the central axis 220 of the aft engine 200, substantially three hundred and sixty degrees (360°) around the mean line 18 of the aircraft 10, and substantially three hundred and sixty degrees (360°) around the recessed portion 216 of the fuselage 20 of the aircraft 10.

Notably, by positioning the aft engine 200 such that the nacelle 224 of the aft engine 200 extends at least partially around the recessed portion 216 of the fuselage 20, a bottom portion 248 of the nacelle 224 may not interfere with, e.g., the takeoff angle 48 of the aircraft 10 (see also FIG. 2). For example, as shown, the nacelle 224 of the aft engine 200 includes at least a portion located inward of the bottom reference line 214 defined by the frustum 206 (see also FIG. 3). Particularly for the embodiment depicted, an entirety of the bottom portion 248 of the nacelle 224 is positioned in-line with, or inwardly of the bottom reference line 214 of the frustum 206. For at least certain prior art aircrafts, the bottom reference line 214 of the frustum 206 indicates the conventional shape for a bottom portion of a fuselage at an aft end of an aircraft.

However, as the nacelle 224 of the aft engine 200 is positioned around the recessed portion 216 of the fuselage 20, and as at least the bottom portion 248 of the nacelle 224 is sunken-in from the bottom reference line 214 of the frustum 206, air entering the aft engine 200 from a bottom portion 248 of the fuselage 20 may not be flowing in a direction parallel to the central axis 220 of the aft engine 200 (as is conventional for aircraft engines; see, e.g., the first and second aircraft engines 42, 44 in FIGS. 1 and 2). Accordingly, the bottom portion 248 of the nacelle 224 is shaped and oriented to more fully capture such a flow of air. For example, for the embodiment depicted, the bottom portion 248 of the nacelle 224 defines a cord line 250 extending between the forward end 246 and an aft end 252. The bottom portion 248 of the nacelle 224 is oriented such that the cord line 250 defined by the bottom portion 248 of the nacelle 224 extends substantially parallel to the bottom reference line 214 defined by the frustum 206. Similarly, the bottom portion 248 of the nacelle 224 defines an inner surface 254 and an outer surface 256. For the embodiment depicted, at least a portion of the outer surface 256 of the bottom portion 248 of the nacelle 224 also extends substantially parallel to the bottom reference line 214 of the frustum 206.

Furthermore, referring also to FIG. 6, given the shape of the recessed portion 216 of the fuselage 20 located aft the frustum 206 defined the fuselage 20, a flow of boundary layer air over the fuselage 20 into the aft engine 200 may not be uniformly distributed along the circumferential direction $C_2$ of the fuselage 20. Specifically, the momentum of the boundary layer air flowing into the aft engine 200 may be less at bottom side 204 of the fuselage 20 as compared to the top side 202 of the fuselage 20 (see FIG. 4). Accordingly, the inlet 244 defined by the nacelle 224 with the fuselage 20 of the aircraft 10 may define a non-axis symmetric shape with respect to the central axis 220 of the aft engine 200. For example, the inlet 244, which extends substantially three hundred and sixty degrees (360°) around the fuselage 20, includes a top half 258 positioned above the central axis 220 and a bottom half 260 positioned below the central axis 220. The top and bottom halves 258, 260 of the inlet 244 are depicted separated by a horizontal reference line 262 extending through the central axis 220. Moreover, the top half 258 of the inlet 244 defines a top half inlet area and the bottom half 260 of the inlet 244 defines a bottom half inlet area. The bottom half inlet area is greater than the top half inlet area, such that the inlet 244 may be configured to capture a sufficient amount of the boundary layer air flowing over the bottom side 204 of the fuselage 20 with less momentum.

Further, for the embodiment depicted, the non-symmetric shape of the inlet 244 is a result of the bottom half 260 being larger than the top half 258 to capture the desired amount of boundary layer air. Accordingly, in other embodiments, the inlet 240 may define a height H along the radial direction $R_2$ and a midpoint 245 (i.e., a halfway point of the inlet 240 along the radial direction $R_2$). The top half 258 may instead be defined as a portion of the inlet 244 positioned above the midpoint 245 and the bottom half 260 may instead be defined as a portion of the inlet 244 positioned below the midpoint 245. As with the embodiment discussed above, the top half 258 of the inlet 244 defines a top half inlet area and the bottom half 260 of the inlet 244 defines a bottom half inlet area, with the bottom half inlet area being greater than the top half inlet area. For example, in this embodiment (or in the above embodiment), the bottom half inlet area may be at least about ten percent greater than the top half inlet area.

Notably, the nacelle 224 also defines a non-axis symmetric shape at the forward end 246 with respect to the central axis 220 of the aft engine 200 in order to accommodate the non-axis symmetric shape of the inlet 244 defined by the nacelle 224. For example, nacelle 224 may define a non-axis symmetric shape at a highlight plane 247 of the aft engine 200, the highlight plane 247 defined by the forward end 246 of the aft engine 200. As is depicted, for the embodiment depicted, the highlight plane 247 is not a vertical plane. In still other exemplary embodiments, the nacelle 224 may additionally define a vertical reference plane (not labeled), the reference plane extending in the vertical direction V and lateral direction L (see FIGS. 1 and 2). The nacelle 224 may further define a non-symmetrical shape at the reference plane. It should be appreciated that as used herein, the term "non-axis symmetric" with respect to the centerline axis 220 refers to a cross-sectional shape that does not exhibit symmetry about the centerline axis 220, and that the term "non-symmetrical" simply refers to a cross-sectional shape that does not exhibit symmetry about a center point.

Figure 7:
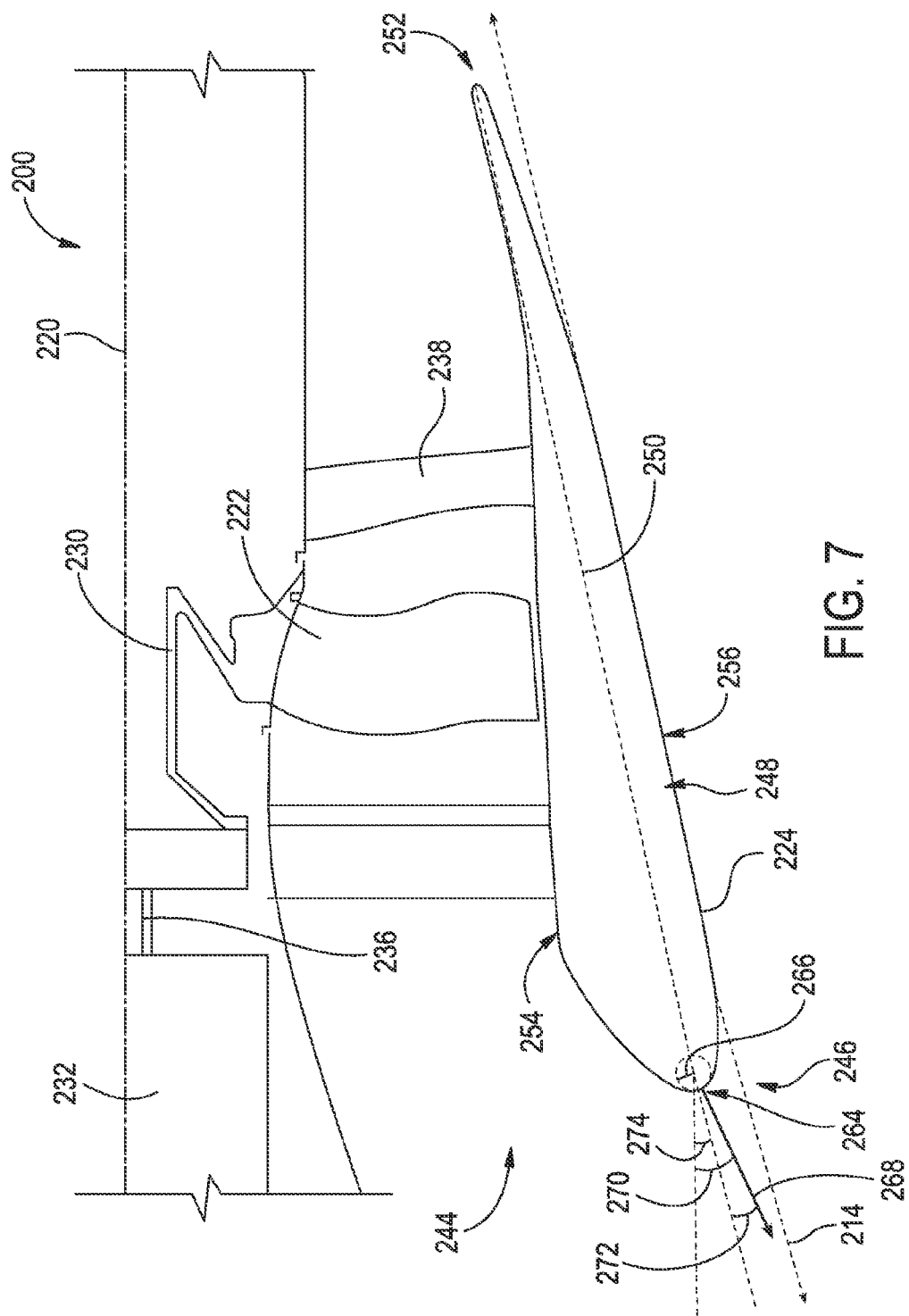
FIG. 7 is a close-up, schematic, cross-sectional view of a bottom portion of the exemplary aft engine of FIG. 5.

Referring back to FIG. 5, and now also to FIG. 7, a forward end 246 of the bottom portion 248 of the nacelle 224 of the aft engine 200 will be described. Specifically, FIG. 7 provides a close-up, cross-sectional view of the bottom portion 248 of the nacelle 224 of the aft engine 200 in FIG. 5.

As discussed above, air entering the aft engine 200 depicted may not be flowing in a direction parallel to the central axis 220 of the aft engine 200. Such may be a result of the recessed portion 216 of the fuselage 20 and the sunken-in configuration of at least the bottom portion 248 of the nacelle 224 of the aft engine 200. In order to maximize an amount of air captured by the aft engine 200, the forward end 246 of the bottom portion 248 of the exemplary nacelle 224 is configured specifically to accommodate the off-axis flow of air for which the aft engine 200 is designed to receive.

Specifically, the forward end 246 of the bottom portion 248 of the nacelle 224 defines a reference point, which for the embodiment depicted is a stagnation point 264. The term "stagnation point" refers generally to a point in a flow field where a local velocity of a fluid is equal to zero. The stagnation point 264 depicted aligns with a point on the forward end 246 having the smallest radius of curvature 266 when the aft engine 200 is operated at maximum capacity. Additionally the stagnation point 264 is positioned proximate the outside surface 256 of the bottom portion 248 of the nacelle 224 (i.e., the stagnation point 264 is positioned closer to the outside surface 256 of the bottom portion 248 of the nacelle 224 than the inside surface 254 of the bottom portion 248 of the nacelle 224). Moreover, the forward end 246 of the bottom portion 248 the nacelle 224 defines a normal reference line 268 extending normal from the stagnation point 264 on the forward end 246 of the bottom portion 248 of the nacelle 224. The normal reference line 268 defines an angle 270 with the central axis 220 of the aft engine 200 that is greater than zero. Notably, as used herein, the angle between the normal reference line 268 and the central axis 220 of the aft engine 200 is greater than zero when the normal reference line 268 extends outwardly from the central axis 220 of the aft engine 200 (as shown). For example, in certain exemplary embodiments, the angle 270 defined between the normal reference line 268 and the central axis 220 of the aft engine 200 may be greater than about five degrees, greater than about ten degrees, greater than about fifteen degrees, or greater than about twenty degrees.

Further, as previously stated the bottom portion 248 of the nacelle 224 defines a cord line 250. For the embodiment depicted, the normal reference line 268, extending normal from the stagnation point 264, also defines an angle 272 with the cord line 250 that is greater than zero. Moreover, the bottom portion 248 of the nacelle 224 is oriented to capture a maximum amount of boundary layer air, as well as to accommodate, e.g., the takeoff angle 48 of the aircraft 10. Accordingly, as is depicted, the chord line 250 also defines an angle 274 with the central axis 220 that is greater than zero. For example, in at least certain exemplary embodiments, the angle 274 may be greater than or equal to about five degrees, greater than or equal to about ten degrees, greater than or equal to about fifteen degrees, or greater than or equal to about twenty degrees.

An aircraft having a fuselage shaped in the manner described above and/or an aft engine configured in the manner described above may allow for an increased overall propulsive efficiency by incorporating the aft engine in the aircraft's propulsion system, without detrimentally affecting a takeoff angle of the aircraft and effectively capturing a flow of boundary layer air from the fuselage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft extending between a forward end and an aft end, the aircraft comprising:
   a fuselage defining a top side and a bottom side, the fuselage additionally defining a frustum located proximate the aft end of the aircraft, the frustum defining a top reference line extending along the frustum at the top side of the fuselage and a bottom reference line extending along the frustum at the bottom side of the fuselage, the top and bottom reference lines meeting at a reference point located aft of the frustum, the fuselage further defining a recessed portion located aft of the frustum and indented inwardly from the bottom reference line; and
   an aft engine including a nacelle extending adjacent to the recessed portion of the fuselage.

2. The aircraft of claim 1, wherein the aircraft defines a vertical direction, wherein the frustum is defined in part by a forward plane and an aft plane, wherein the frustum defines a first height at the forward plane and a second height at the aft plane, and wherein the first height is greater than the second height.

3. The aircraft of claim 1, wherein the nacelle of the aft engine includes at least a portion located inward of the bottom reference line.

4. The aircraft of claim 1, wherein the aircraft defines a mean line extending from the forward end to the aft end, and wherein the nacelle extends substantially 360 degrees around the mean line of the aircraft.

5. The aircraft of claim 1, wherein the nacelle includes a bottom portion, and wherein the bottom portion defines a cord line extending substantially parallel to the bottom reference line.

6. The aircraft of claim 1, wherein in the nacelle includes a bottom portion and an outer surface, and wherein at least a portion of the outer surface of the nacelle at the bottom portion of nacelle extends substantially parallel to the bottom reference line.

7. The aircraft of claim 1, wherein the nacelle defines an inlet with the fuselage, and wherein the inlet extends substantially 360 degrees around the fuselage.

8. The aircraft of claim 1, wherein the aft engine defines a central axis, wherein the nacelle defines an inlet, and wherein the inlet defines a non-axis symmetrical shape with respect to the central axis.

9. The aircraft of claim 1, wherein the nacelle of the aft engine extends at least partially around the recessed portion of the fuselage.

10. The aircraft of claim 1, wherein the nacelle defines an inlet having a top half positioned above the central axis and a bottom half positioned below the central axis, wherein the top half of the inlet defines a top half inlet area, wherein the bottom half of the inlet defines a bottom half inlet area, and wherein the bottom half inlet area is greater than the top half inlet area.

11. The aircraft of claim 1, wherein the nacelle includes a forward end and a bottom portion, wherein the forward end of the bottom portion of the nacelle defines a stagnation point, wherein the forward end of the bottom portion of the nacelle defines a curved shape, and wherein the stagnation point aligns with a point on the forward end having the smallest radius of curvature when the aft engine is operated at maximum capacity.

12. The aircraft of claim 1, wherein the frustum defines a length to average height ratio greater than or equal to about 0.2.

13. An aircraft defining a longitudinal centerline, the aircraft comprising:
    a pair of wings, each wing defining a top side and a bottom side and having landing gear extending from a bottom side thereof;
    a fuselage defining a top side and a bottom side, the bottom side of the fuselage and the landing gear together defining a maximum takeoff angle with the longitudinal centerline, the fuselage further defining a recessed portion at the bottom side of the fuselage located aft of the pair of wings and defining an angle with the longitudinal centerline greater than the maximum takeoff angle; and
    an aft engine located aft of the pair of wings and including a nacelle extending adjacent to the recessed portion of the fuselage.

14. The aircraft of claim 13, wherein the aircraft defines a mean line extending from a forward end to an aft end, and wherein the nacelle extends substantially 360 degrees around the mean line of the aircraft.

15. The aircraft of claim 13, wherein the nacelle defines an inlet with the fuselage, and wherein the inlet extends substantially 360 degrees around the fuselage.

16. The aircraft of claim 13, wherein the aft engine defines a central axis, wherein the nacelle defines an inlet, and wherein the inlet defines a non-axis symmetrical shape with respect to the central axis.

17. An aircraft defining a longitudinal centerline and extending between a forward end and an aft end, the aircraft comprising:

a fuselage defining a top side and a bottom side, the fuselage further defining a recessed portion located proximate the aft end of the aircraft, the recessed portion of the fuselage at the bottom side of the fuselage defining an angle relative to the longitudinal centerline of the aircraft; and an aft engine located proximate the aft end of the aircraft and including a nacelle extending adjacent to the recessed portion of the fuselage, the angle defined by the recessed portion of the fuselage relative to the longitudinal centerline being greater than a threshold angle for creating separated flow during normal flight if not for operation of the aft engine.

18. The aircraft of claim 17, wherein the angle defined by the recessed portion of the fuselage is greater than about thirteen degrees.

19. The aircraft of claim 17, wherein the angle defined by the recessed portion of the fuselage is greater than about fifteen degrees.

20. The aircraft of claim 17, wherein the aircraft defines a mean line extending from the forward end to the aft end, and wherein the nacelle extends substantially 360 degrees around the mean line of the aircraft.

\* \* \* \* \*